Aug. 18, 1964    R. HAGEN    3,145,243
MANUFACTURE OF HOLLOW PLASTIC ARTICLES
Filed Sept. 8, 1961    5 Sheets-Sheet 2

INVENTOR
Reinold Hagen
BY

Aug. 18, 1964 R. HAGEN 3,145,243

MANUFACTURE OF HOLLOW PLASTIC ARTICLES

Filed Sept. 8, 1961 5 Sheets-Sheet 3

INVENTOR
Reinold Hagen
BY

United States Patent Office 3,145,243
Patented Aug. 18, 1964

1

3,145,243
MANUFACTURE OF HOLLOW PLASTIC ARTICLES
Reinold Hagen, Hangelar uber Siegburg,
Rhineland, Germany
Filed Sept. 8, 1961, Ser. No. 136,846
Claims priority, application Germany Sept. 12, 1960
11 Claims. (Cl. 264—98)

This invention relates to the manufacture of hollow articles from plastics, and more particularly to a process and an apparatus for blowing such articles. Whenever this specification and the appended claims speak of "bottles," such term is understood to comprise hollow bodies of any shape, provided the shape of an embryo article, while in condition of plasticity, permits its being blown by fluid pressure into molding contact with a mold cavity-defining wall and thus to the desired final shape.

For the purpose of the invention, any plastic material may be used which is capable of becoming softened and workable when heated at relatively low temperatures and which, while soft and workable, may be expanded under fluid pressure into desired shapes. The blown articles, upon cooling, become rigid. For instance, low, medium and high density polyethylene, polystyrene, plasticized and nonplasticized polyvinyl chloride and nylon may be used.

The primary object of the present invention is to generally improve the manufacture of hollow plastic articles by blowing.

In producing bottles, other containers, and other hollow articles from plastics, for instance, by blow-molding, articles are obtained which have waste material adhering thereto that must be removed. So far, such removal has been done by hand. Each article, upon its ejection from the mold, has to be picked up by hand so that any waste can be removed by hand. This hand-operation is slow and expensive. An important object of this invention is, therefore, to provide an apparatus which will remove all waste clinging to a blow-molded article automatically. Thus, my invention aims at speeding up and cheapening the manufacture of hollow plastic articles. The waste material here involved is ordinarily referred to as "flashing."

Another important object of the invention is to provide a waste-removing or flashing-tearing device the provision and operation of which does not interfere either with blow-molding equipment or blow-molding cycles. The waste-removal does not collide with the blow-molding equipment, and the operation of the waste-removing device falls within the usual sequence of operations of the blow-molding cycle.

The automatic waste-removal according to the invention is directed at waste in whatever location it may appear. In blow-molding, waste forms at places where the preform used is pinched by closing mold sections. If, for instance, a bottle or another container having a necklike formation is produced, waste usually appears at the bottom and neck of the bottle or container. The present invention provides that waste in all possible locations be torn off from the blown article independently from the mold equipment.

Other objects of the invention center about a process and an apparatus for the removal of plastic waste, which are easily adaptable to varying constructions of blow-molding equipment and thus to varying conditions.

One object of the invention is to provide a waste-removing or waste-stripping device, which is simple, of relatively small dimensions, inexpensive, and economical in operation.

Further objects will be apparent from the following description.

2

The specification is accompanied by drawings in which.

Referring to the drawings in greater detail, and initially to FIGS. 1 to 16, an extrusion nozzle 10 of an extruder 11 has an annular outlet orifice to extrude the plastic material used in form of a tube. As soon as an adequate length of tubing has been extruded, and while the tubing is still in a condition of plasticity, a two-part grasping or gripping device 13, adapted to be closed and opened, closes and severs a tube length 12 from its parent body and carries this length vertically downward into the space between two open sections 14, 14' of a mold. The leading end 12' of the tube 12 is open and slips over a blow pipe 15 which extends into the open mold space from opposite the extrusion nozzle and is axially aligned with the downwardly moving tube. When the tube 12 has reached a position in which it extends beyond the upper and lower edges of the mold, with the grasping device 13 remaining outside the mold, the mold sections are closed upon the tube to assume the position shown in FIG. 2 and to convert thereby the tube into a bubble (not shown) closed at the top and open at the bottom. As the mold closes, an end portion 12a of the tube 12 is pinched off, while at the other end of the tube an end portion is press-molded against the blow pipe 15.

When working according to known processes or with the aid of known equipment, waste, such as the portion 12a clings to the bottom of the article formed at 18 (see FIG. 2) and is ordinarily removed by hand. Such trimming requires that every single article formed has to be picked up by hand. My present invention provides that waste, such as the end portion 12a, as well as waste in any other place is automatically removed rather than by hand. According to the present invention, the closed grasping device 13 continues to hold the portion 12a during the closing of the mold but moves upwardly, immediately upon the closing of the mold, In the direction of the arrow 19 and thereby separates the portion 12a from the bottle by tearing it off.

Figure 1:
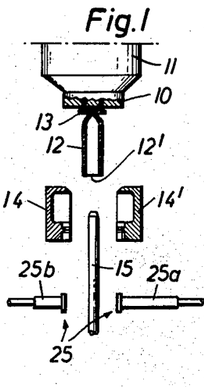
FIGS. 1 to 6 show, in side elevational views, partly sectioned, an apparatus for the manufacture of bottles by blowing, the apparatus embodying a waste-removing device according to my invention, the six views illustrating different positions of parts of the apparatus and different operational conditions.
Figure 2:
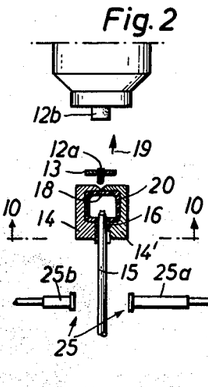

While the grasping device moves upwardly, a new length 12b of tubing is being extruded. FIGS. 2, 3, 4, 5 and 6 show how this new length gradually increases. The grasping device 13 is shown in FIG. 2 in closed or grasping condition and on its upward way, and in FIGS. 3 to 6 it is shown in open condition and at its upper level. In the situation shown in FIG. 6, when the length 12b has reached the length of the tube 12, shown in FIG. 1, the grasping device closes about the new tube length 12b to separate it from the parent plastic material in the nozzle and to transport it downwardly into the open mold space.

Figure 14:
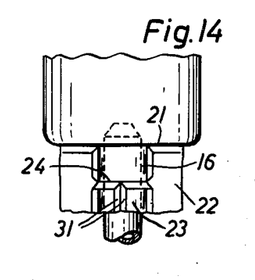
FIG. 14 is a vertical section taken in the plane of the line 14—14 of FIG. 11.

It usually happens that a blown article has waste cling thereto in more than one place. A blown bottle 20 as shown in FIGS. 2 to 5 and 11, although free of waste material at its bottom, has waste material adhering thereto at its neck 16. Such additional waste material is best shown in FIG. 14. It has the form of two fins 22 appearing on the shoulder 21 of the bottle and on opposite sides of the neck 16 and of an annular body 23 appearing on the neck and between the fins. From the way the fins 22 form, when the mold closes, it will be clear that they extend on opposite sides of the neck across a plane that coincides with the parting plane of the mold. The annular body 23 is a sort of extension of the bottle neck and is connected with the same at 24. The fins 22 and the annular extension 23 are connected to each other and to the main body of the bottle, that is, to the shoulder 21 and neck 16, by means of thin webs which so far have been torn off by hand. Such webs form due to the fact that the cutting edges of the mold sections pinch opposing material thicknesses strongly together without actually cutting.

Figure 3:
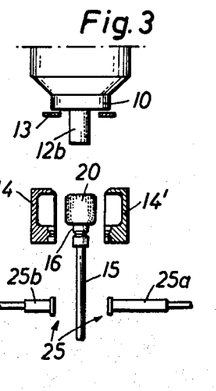
Figure 4:
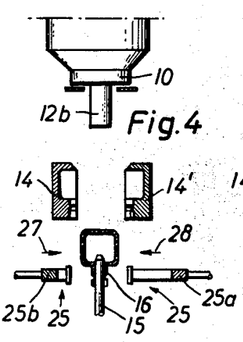

My invention provides that for the purpose of automatically removing waste material, such as the fins 22 and the annular extension 23, the bottle 20, while still supported by the blow pipe 15, is, upon the opening of the mold, moved downwardly, that is, below the level of the mold 14. In FIG. 3, the bottle 20 is shown at the level of the mold, whereas in FIGS. 4 to 6 it is shown at a level lower than that of the mold. The bottle is moved downwardly by moving the blow pipe downwardly. This downward movement brings the bottle in reach of a device 25 (see FIG. 4) which separates both the fins 22 and the annular extension 23 from the bottle. This device consists of two cooperating members 25a and 25b which are mounted to be moved in the directions of the arrows 27 and 28 from the open position shown in FIGS. 1 to 4 and 7 toward each other into the closed position shown in FIGS. 5, 8, 11 and 12.

Figure 5:
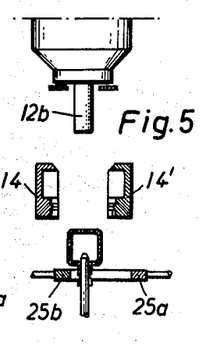
Figure 6:
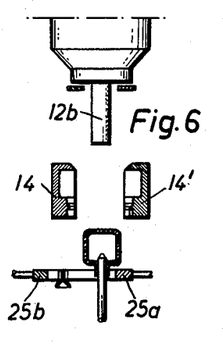
Figure 8:
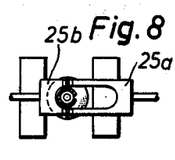
Figure 9:
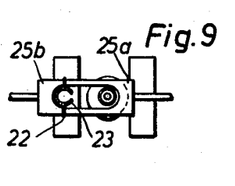
Figure 10:
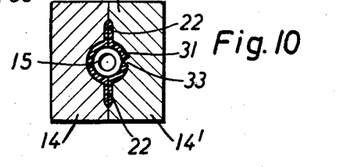
FIG. 10 is a section taken in the plane of the line 10—10 of FIG. 2.
Figure 11:
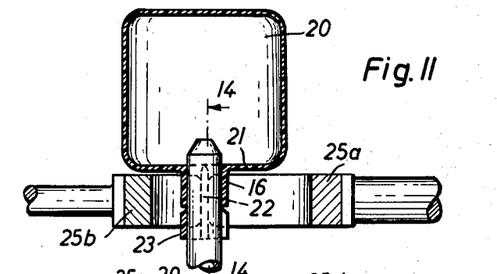
FIG. 11 is a detail of the view of FIG. 5, drawn to enlarged scale.

The members 25a and 25b are of forklike configuration so that the tines 25d of the member 25a and the tines 25c of the member 25b, in the closed condition of the device 25, shown, for instance, in FIGS. 5 and 8, may receive the blow pipe 15 and the neck 16 of the bottle 20 carried by the blow pipe. As can be seen from FIG. 11, the members 25a and 25b are of relatively thin section, when viewed vertically, in order not to be higher than the length of the bottle neck 16 and thus to permit being moved underneath the shoulder 21 of the bottle. It will be appreciated that shape and dimensions of the members 25a, 25b depend on the circumstances in every case, such as the shape of the article to be freed of waste material, and the formation of waste material.

Figure 7:
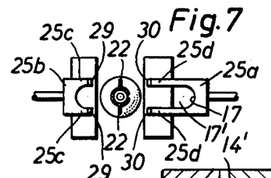
FIGS. 7 to 9 are bottom views of the waste-removing device of the apparatus as shown in FIGS. 4 to 6.

Since the fins 22, as has been indicated, extend in the parting plane of the mold, they are substantially parallel to the frontal faces 29, 30 of the members 25a and 25b, respectively (see FIG. 7). The closing and opening movements of the members 25a, 25b are perpendicular to the parting plane. To close the device 25 its members are moved toward each other until the frontal faces 29, 30 engage the fins on opposite sides, as can be seen from FIGS. 5, 8, 11 and 12. After such engagement has taken place, a relative motion between the bottle 20 and the blow pipe 15, on the one hand, and the members 25a, 25b, on the other hand, is effected. If blow pipe and bottle stand still, the members 25a, 25b are moved to the left, that is, from the position shown in FIGS. 5, 8, 11 and 12 into the position of FIGS. 6, 9 and 13. While the bottle which is supported by the blow pipe stands still, the fins 22 clamped between the frontal faces 29, 30 of the members 25a, 25b participate in the referred to relative movement and are separated from the neck 16 and shoulder 21 of the bottle, which can clearly be seen from FIGS. 6, 9 and 13.

From FIGS. 5, 8, 11 and 12 it will be seen that the two members 25a and 25b first move toward each other so that the frontal faces 29, 30 engage the fins 22 on both sides. The tines 25d of the right-hand member 25a being longer than the tines 25c of the left-hand member 25b, as can be seen, for instance, from FIGS. 1 to 9, the members 25a, 25b, with the fins 22 sandwiched between them, may be moved to the left until the neck 16 is received in the bed 17 of the long slot 17'. If a member like the one designated 25a, with long tines and a long slot, is provided on the left-hand side, and if the member having short tines and a correspondingly short slot is provided on the right, the two members with waste material between them would have to move to the right.

Figure 15:
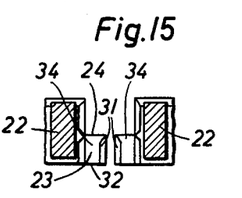
FIG. 15 is a section taken in the plane of the line 15—15 of FIG. 13.
Figure 16:
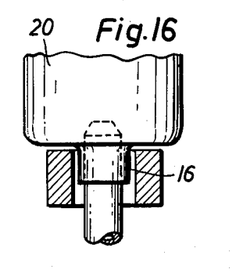
FIG. 16 is a section taken in the plane of the line 16—16 of FIG. 13.

FIG. 15 shows the plastic waste in separated condition. It consists of the fins 22 and the annular extension 23. The webs which connect the fins 22 to the shoulder 21 and neck 16 (see FIG. 14) are thin and extend in a single plane. They are easily severed or torn off by a force which acts in a direction perpendicularly to the extent of the fins, as is exerted by the movement of the members 25a, 25b. The extension 23 of the bottle neck being annular, the web which connects this extension to the frontal face of the neck is of circular shape. To make it possible for the annular extension, when exposed to the pressure exerted by the members 25a, 25b against the fins 22, to clear the blow pipe 15, the extension is provided with a notch 31 as shown, for instance, in FIG. 10. This notch extends substantially from the frontal face of the neck 16 at 24 (FIG. 15) to the free edge 32 of the extension. The notch 31 which weakens or actually splits the material of the extension 23 is produced during forming of the article in the mold 14. For this purpose, the mold half 14' is provided, as can again be seen from FIG. 10, with a wedgelike formation 33 which projects into the annular space defined by the blow pipe 15 and the mold halves 14, 14'. It will be appreciated that the projection 33 is provided along the vertical extent of the extension 23 and is formed during the closing of the mold since the neck 16 as well as the extension 23 are formed by pressmolding, as has been stated hereinbefore (see FIGS. 14 and 15).

The notch 31 makes it possible for the annular extension 23 to be easily removed from the neck 16, together with the fins 22, when the members 25a, 25b move relative to the blow pipe 15 and bottle 20 and take the fins sandwiched between the members 25a, 25b along. The annular extension bursts open along the notch 31 so that the end portions 34 (see FIG. 15) of what has been the closed annular extension before may be moved past the blow pipe 15, the plastic material of the open annulus being elastic and permitting the end portions 34 to be spread to allow the blow pipe to move out of the now open enclosure.

FIGS. 6, 9, 13 and 16 show the bottle 20 freed of the fins 22 and the annular extension 23, in which condition the bottle may be withdrawn from the blow pipe 15 in any suitable way.

It is to be understood that while an article is blown, the blown article, upon opening of the mold, is lowered, and the article is freed of waste material, the extrusion continues. When a finished article is withdraw or ejected from a blow pipe, a new length of freshly extruded tubing is moved downwardly into the open space of the mold, as has been explained hereinbefore, while at the same time the blow pipe is raised to have the leading end of the fresh tube length slip over the free end portion of the blow pipe. The downward movement of the blown article, upon the opening of the mold, makes it possible for the article to be mechanically freed from the waste material clinging thereto and from being withdrawn from the blow pipe without interfering with continuous extrusion and freshly extruded tubing.

The operations of closing the mold upon a length of tube, blowing the hollow article, opening the mold, lowering the blow pipe and blown article, trimming the article of its waste material, ejecting the finished article, raising the blow pipe, etc. are automatically controlled in a predetermined sequence and are adjusted to the rate of extrusion, whereby the time needed for cooling the blown article is also taken into consideration. For instance, if due to a slower rate of extrusion and/or a shorter cooling and solidifying period, there is no interference with freshly extruded tubing when a finished article is removed from a blow pipe even though the waste-removing device of the invention is arranged at a higher level as shown in FIGS. 1 to 6, say, immediately below the mold, there is, of course, no objection to providing the waste-removing device at a suitable higher level.

In FIGS. 1 to 16, two waste-removing devices are shown, the gripping device 13 and the device 25. The former is generally operated by closing, lowering, raising, and opening, and the latter is generally operated by closing, laterally moving, laterally returning, and opening. It is to be understood that these fourfold motions need not be cleanly separated. For instance, the device 13 may be raised while it opens. Any suitable means may be used to actuate the two devices.

Figure 17:
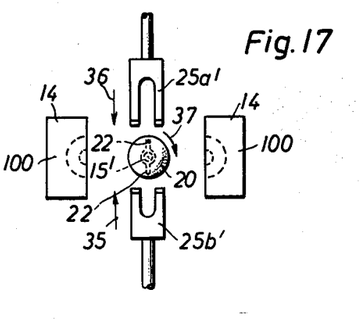
FIGS. 17 and 18 illustrate a modified waste-removing device in two different stages of operation.
Figure 18:
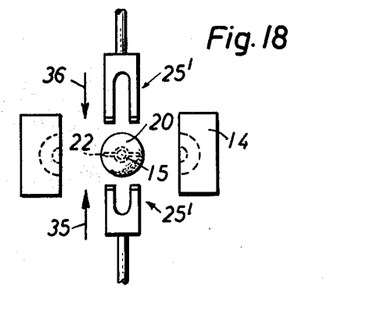

While according to the construction of FIGS. 1 to 16, the complementary members 25a, 25b of the waste-removing device 25 are operated in the same directions as are the mold sections, that is, perpendicularly to the parting surface of the mold, the construction of FIGS. 17 and 18 requires the waste-removing device 25' to be operated perpendicularly to the closing and opening directions of the mold or parallel to the parting surface of the mold, that is, in the directions of arrows 35, 36. In FIG. 17, a bottle 20 is shown to be supported by a blow pipe 15'. Also indicated are fins 22 which extend in the same direction as do the fins shown, for instance, in FIG. 7, namely, parallel to the parting plane of the mold. As distinguished from the construction dealt with in FIGS. 1 to 16, the construction of FIGS. 17 and 18 includes a blow pipe which is rotatable about its longitudinal axis in the direction of the arrow 37. In FIG. 18, the blow pipe 15' appears turned through 90°, and as the blow pipe turns, the article supported by it and the fins 22 also turn. The turned fins are shown to extend perpendicularly to the parting plane of the mold and to be ready to be acted upon by the members 25a', 25b'. The latter are constructed and operated as has been shown and described with respect to FIGS. 1 to 16. The fins and the annular extension of the bottle neck are removed as has likewise been explained.

The blow pipe 15' may be mounted to be lowered and raised as in the construction of FIGS. 1 to 16 but it need not be lowered as in the case of the construction of FIGS. 1 to 16 to permit the operation of the waste-removing device. In the construction of FIGS. 1 to 16, the blown article has to be lowered to make the operation of the waste-removing device possible since the mold and waste-removing device would otherwise interfere with each other. In the construction of FIGS. 17 and 18, the members 25a', 25b' can be operated at the level of the mold without interference since they can freely be moved at any level of the height of the open mold space.

Figure 19:
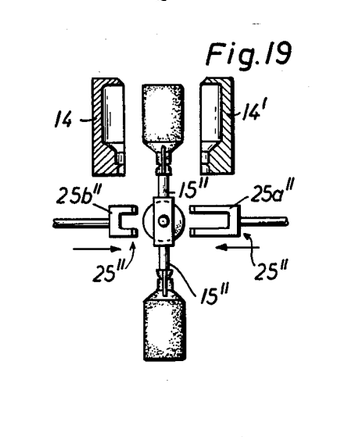
FIGS. 19 and 20 show in two elevational views another modification of the waste-removing device of the invention.
Figure 20:
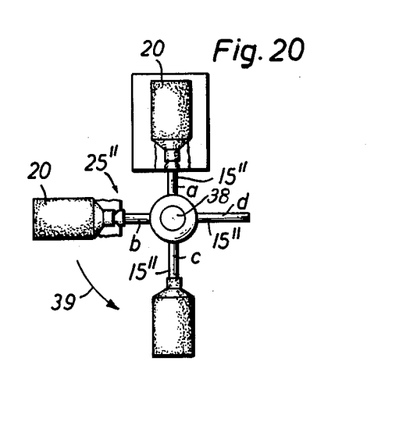

The construction of FIGS. 19 and 20 provides a plurality of blow pipes to cooperate with a single mold. From FIG. 20 it can be seen that four blow pipes 15" are crosswise arranged to be turned about a center 38 so that at any one time one of the blow pipes enters the mold 14, 14' while another blow pipe enters a waste removing station to cooperate with the waste-removing device 25". When working with the construction of FIGS. 19 and 20 and an article has been blow-formed in the mold 14, 14', the mold is opened and the cross of blow pipes is turned through 90° in the direction of the arrow 39. The blown article is carried by the respective blow pipe to the waste-removing station to be trimmed of waste material. When a blow pipe moves from position $a$ to position $b$, the blow pipe from position $b$ moves to position $c$, blow pipe from position $c$ moves to position $d$, and the blow pipe from position $d$ moves to position $a$. In the $b$-position or waste-removing station, the device 25" acts upon fins on the blown article, whereby the fins and a possible annular extension are separated from the bottle 20. During the separation of waste material in position $b$, a new article is formed in position $a$, and as the newly formed article, upon the opening of the mold, is moved to position $b$, the article that has been finished in the position $b$ is moved into position $c$. The finished article is removed either in position $c$ or $d$.

It will be apparent that the waste-removing device need not be in position $b$, that is, adjacent the mold, but may be provided either in position $c$ or $d$. The arrangement will depend on the existing circumstances. If, for instance, a longer cooling period is needed prior to the waste-removing operation, then the waste-removing device is not provided in position $b$, but in position $c$ or $d$.

Figure 21:
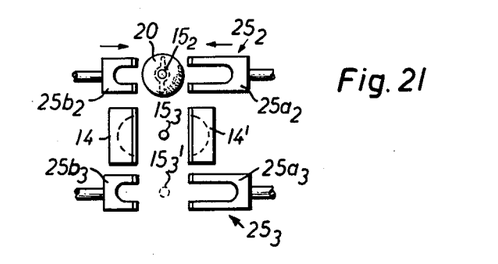
FIG. 21 is a schematic view of a further modification.

The construction of FIGS. 21 to 24 includes for the use of a single mold two blow pipes $15_2$ and $15_3$ and two waste-removing devices $25_2$ and $25_3$. The waste-removing devices are arranged on opposite sides of the mold, with the two members of each of these devices being movable in the same directions as the mold sections. The blow pipes are reciprocatingly movable in the parting plane of the mold and are spaced from each other so that when one of the blow pipes extends into the open mold space or is within the closed mold the other blow pipe is in one of the two waste-removing stations. In FIG. 21, the blown unfinished article is shown to be ready to be finished by means of the waste-removing device $25_2$.

Figures 22, 23, 24:
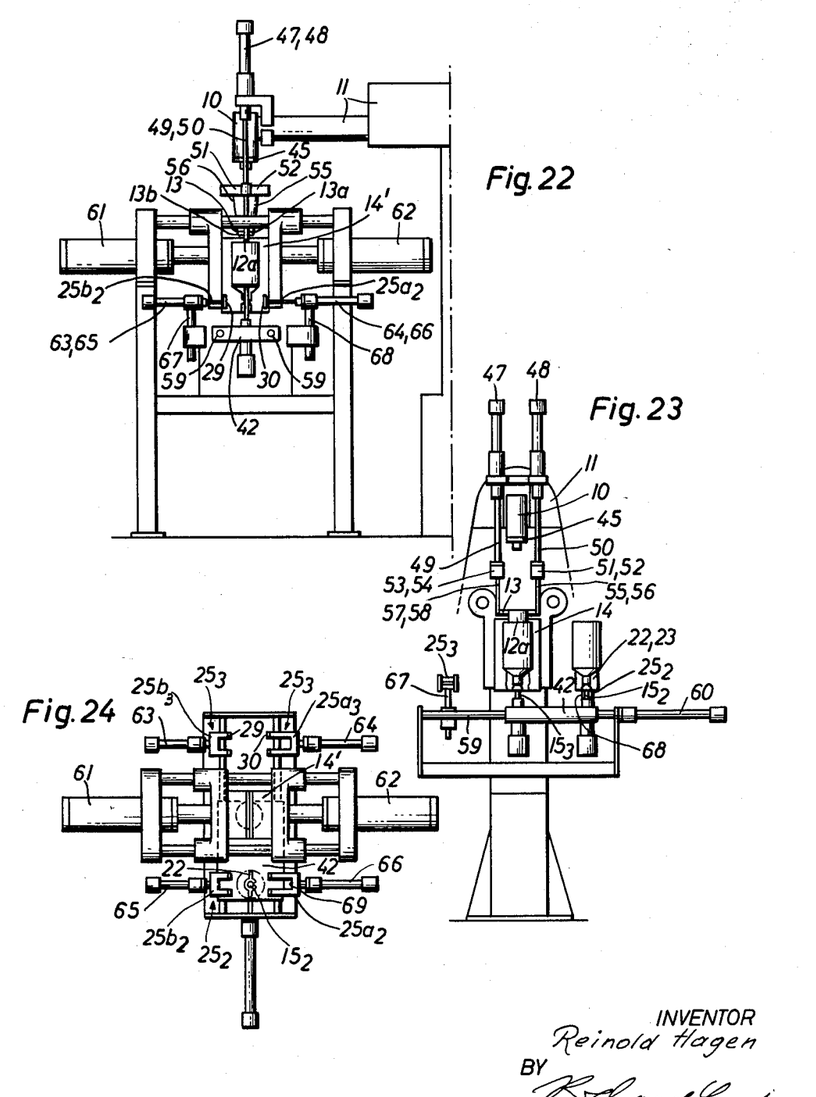
FIGS. 22 to 24 illustrate, in an elevational, elevational, and plan view, respectively, the modification of FIG. 21.

FIG. 21 shows the blow pipe $15_2$ and the bottle 20 which is supported by blow pipe $15_2$ in the station of the waste-removing device $25_2$, outside the mold 14, 14'. The blow pipe $15_3$ is shown to extend into the open mold space. The bottle is freed from plastic waste by the cooperating members $25a_2$, $25b_2$ of the device $25_2$, as has been explained before. While the separation of the waste takes place and the finished bottle is removed from the blow pipe $15_2$, a new length of tubing is extruded over the blow pipe $15_3$ and the mold is closed upon the freshly extruded tubing and, upon blowing, again opened. Then, the blow pipes $15_2$ and $15_3$ which are preferably carried by a common support 42 (see FIGS. 22 to 24) are slid in the direction toward the station of the waste-removing device $25_3$ until the blow pipe $15_2$ assumes the position within the open mold space, previously assumed by blow pipe $15_3$, and the blow pipe $15_3$ carrying a newly blown unfinished bottle reaches the position $15_3'$ shown in a broken line. Next, freshly extruded tube is received by blow pipe $15_2$ while the last produced unfinished bottle is finished in the station of the device $25_3'$. Thus, in the embodiment selected for illustration in FIGS. 21 to 24, the blow pipe $15_2$ cooperates with the device $25_2$ whereas the blow pipe $15_3$ cooperates with the device $25_3$. Aside from the time needed for the movements of the blow pipes, while one of the blow pipes is in the mold the other blow pipe is in one of the two waste-removing stations. Details of the construction of FIGS. 21 to 24 and their structural relationship are shown in FIGS. 22 to 24.

The construction and operation of the mechanism to raise and lower and to open and close the grasping or gripping device is as follows: The mold 14, 14′ is spacedly mounted with respect to the annular extrusion nozzle 45. A gripping device 13 consisting of two parts 13a and 13b severs a length of tubing from the parent body of plastic material near the bottom of the extrusion nozzle and carries the tube length thus severed downwardly. In FIGS. 22 and 23, the grasping device is shown at its lowest level. Provisions may, of course, be made that the severing is done in such a way that the leading end of the parent tube from which a tube length has been severed will stay open after severing. The raising and lowering of the grasping device 13 is effected over cylinders 47 and 48 which are supported, as is shown in FIG. 22, by the extruder 11. Slidingly accommodated in these cylinders are fluid-operated pistons 49 and 50 to reciprocate in the same direction at any one time. At the free ends of these pistons, cylinders 51, 52 and 53, 54 are mounted for reciprocation whereas the pistons in these cylinders are stationary. The cylinders 51, 52, 53 and 54 are connected to arms 55, 56 and 57, 58 which carry the parts 13a, 13b of the grasping device 13 at their lower ends. The opening and closing of the grasping device is effected by the cylinders 51, 52, 53, 54 over the arms 55, 56, 57, 58. After the closing of the mold upon a tube length that has been transported by the closed grasping device downwardly into the open mold space, the closed grasping device is returned upwardly with the aid of the cylinders 47, 48, whereby, as has been described with reference to FIG. 2, waste material 12a tears off from the bottom of the bottle 20 and is taken along by the grasping device during its upward travel. Before the grasping device reaches its uppermost level, it opens. This opening is done by the cylinders 51, 52, 53, 54 which by means of the arms 55, 56, 57, 58 cause the parts 13a and 13b of the grasping device to move apart. The waste material 12a drops from the grasping device. Various means may be provided to transport the waste material away when it has dropped. The grasping device reaches its uppermost position in open condition. This is necessary so that any interference with freshly extruded tubing is avoided. As soon as fresh tubing has been extruded in adequate length, the grasping device grips the tube length at its upper end, at the extrusion nozzle 45, severs the tube length from the extrusion nozzle, and transports the severed length downwardly for the blowing of the next article to be produced.

The two waste-removing devices $25_2$, $25_3$ are operated as follows: Upon closing of the mold and the inflation of a tube length within the mold, with the inflated bottle being supported by the blow pipe $15_3$, and upon opening of the mold, the blow pipe $15_3$ supporting the freshly blown and sufficiently solidified bottle moves across the parting plane of the mold to the station of the waste-removing device $25_3$ to be stripped thereof the waste material still adhering to the bottle. When the blow pipe $15_3$ was ready to be moved to position $15_3'$ or the position of the device $25_3$ or to the left in FIG. 23, the bottle in the position of the waste-removing device $25_2$ had been freed of waste material and ejected from the blow pipe $15_2$, allowing the blow pipe $15_2$ to move into the open mold space. The support 42 hereinbefore referred to is mounted to slide on a rail 59. This sliding motion is controlled by a piston accommodated in a cylinder 60. Upon removal of waste material in the station of the device $25_3$, the bottle freed from such material is removed from the blow pipe $15_3$, and the latter moves to the right (FIG. 23) back into the open mold space, while a newly formed bottle carried by the blow pipe $15_2$ also moves to the right to be finished by the device $25_2$. The devices $25_2$ and $25_3$ are opened and closed by means of hydraulic or pneumatic cylinders 65, 66 and 63, 64, respectively. It should be noted that the bars 67 and 68 which carry the device $25_3$ and $25_2$, respectively, are adjustable so that the devices can be used in different heights depending on the shape and dimensions of the articles to be produced. For similar reasons, each of the devices $25_2$ and $25_3$ is exchangeable to be adapted to the shape of the particular plastic to be removed. From FIGS. 22 and 24 it can be seen that the frontal faces 29 and 30 of the devices $25_2$ and $25_3$ are flat to ensure proper engagement of the fins 22.

Reference is made to a copending application of mine, Serial No. 120,828, filed May 16, 1961, which deals with the shortening of the cooling time of freshly blown plastic articles and the withdrawing of such articles from a mold when solidified to a self-supporting state. Among other embodiments, said copending application is concerned with a construction using a mold and two blow pipes, with the blow pipes being similarly arranged as in the construction of the present FIGS. 21 to 24.

Each of the devices $25_2$ and $25_3$ is equipped with a pair of cylinders 63, 64 and 65, 66, respectively. The cylinders 65, 66 first move the parts $25a_2$ and $25b_2$ toward each other to engage thereby the fins 22 on opposite sides, and then they move to effect the movement relative to the bottle held by the blow pipe $15_2$. The cylinders 63, 64 act similarly in the station of the waste-removing device $25_3$. In the embodiments shown, the bottle is supported by a blow pipe and is stationary whereas the waste-removing devices are movable. It will, however, be appreciated that this relative motion can also be effected by holding the waste-removing devices stationary and moving the bottle instead. In the embodiment of FIGS. 21 to 24, FIGS. 21, 22 and 24 show that the waste-removing device $25a_2$ has to be moved to the left to effect the waste removal. From these three figures it is clear that the tines of the device $25a_2$ are longer than those of the device $25b_2$ and that it is the device $25_2$ that can be moved to the left before the blow pipe and the bottle supported by the blow pipe strike against the crosspiece of the part $25a_2$ at 69 (see FIG. 24). Similarly, it is the part $25a_3$ which has longer tines than the part $25b_3$, that is moved relative to the bottle to be stripped from waste.

In order to cause the movement of the parts $25a_2$ and $25a_3$ to the left, after the two complementary parts have been brought into engagement, with the fins between them, it is possible to increase the pressure in the cylinders 64 and 66. Thus, the force exerted, for instance, by the cylinder 66 upon the part $25a_2$ which according to FIG. 24 is to be moved to the left will be greater than the force exerted by the cylinder 65 upon the part $25b_2$, and this will result in a shift of both devices $25a_2$ and $25b_2$ to the left. Another way of causing the movement of the devices $25a_2$, $25b_2$ and $25a_3$, $25b_3$ to the left may be that the cylinders 66 and 64 are given a larger diameter than the cylinders 65, 63 so that with the same pressure in the cylinders 64, 66 and 63, 65 respectively, a shift to the left will result, this being due to the larger crosswise extending surfaces of the cylinders 66, 64. Still another possibility of effecting the move to the left consists in using spring means instead of the cylinders 63, 65, which spring means would serve to bring the devices $25b_2$, $25b_3$ into engagement with the fins and the opposing devices $25a_2$, $25a_3$, whereupon the movement to the left would be caused by the cylinders 64, 66 acting against the force of the spring means. It will be understood, regardless of the principle employment to cause the relative movement, that the tines of one of the waste-removing parts have a length at least equal to the distance the waste has to be shifted.

Figure 25:
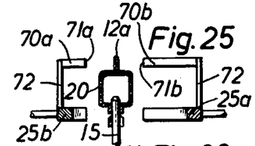
FIGS. 25 to 27 are elevational views of a fifth modification of my waste-removing device.
Figures 26, 27:
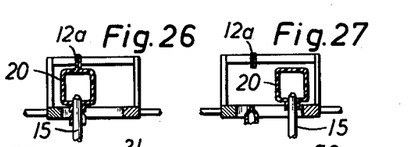

One way of removing the waste material 12a from a blown bottle, and more particularly from the bottom of a bottle, by means of a grasping device 13 has been shown in and explained with reference to FIGS. 1 to 6 and 22 to 24. FIGS. 25 to 27 show another way of removing such waste from the bottom of a bottle. The manner shown in FIGS. 25 to 27 is resorted to especially when for some reason no grasping device is used to sever a length of tubing and to transport the severed length. However, the way to be described presently may be used even if a grasping device is present. Essentially, the device of FIGS. 25 to 27 consists of two jaws 70a, 70b besides two members 25a, 25b (see FIGS. 1 to 16). The jaws 70a, 70b or similar clamping members are mounted to move from a starting or open position (FIG. 25) into a closed position shown in FIG. 26, whereby the frontal faces 71a and 71b of the jaws 70a and 70b engage waste material 12a on the bottom of the blown bottle 20. Then, the jaws 70a, 70b are moved relative to the blow pipe 15 and the bottle carried by the blow pipe in a fashion and by means as has been described hereinbefore with respect to the device 25. It is due to this lateral movement that the waste material 12a is torn off the bottom of the bottle. In the construction of FIGS. 25 to 27, the jaws 70a, 70b are carried by supports 72 secured to the members 25a, 25b. The jaws 70a, 70b and members 25a and 25b are simultaneously actuated by the same actuating means. The members 25a, 25b may be connected to hydraulic or pneumatic cylinders. It should be understood that the supports 72 are adjustable in length, making it possible that the total mechanism 25a and 25b, 72, 70a, 70b can readily be adapted to articles of different heights which are to be finished. It is further to be understood that instead of the jaws 70a, 70b a device may be provided, the members of which are like or resemble those designated 25a, 25b. This possibility will be preferred, for instance, if the article to be finished has two necklike formations on opposite sides.

Figure 12:
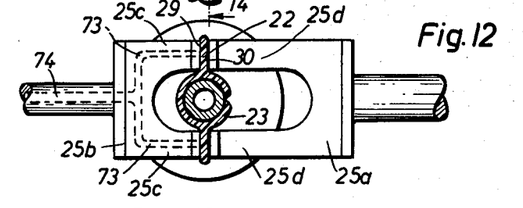
FIG. 12 is a plan view of the showing of FIG. 11.
Figure 13:
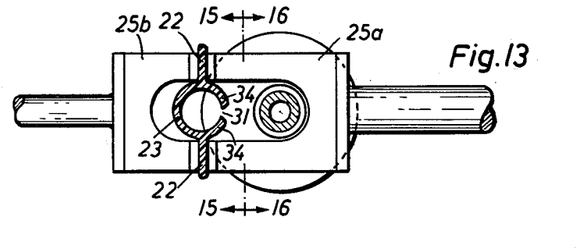
FIG. 13 is a view similar to that of FIG. 12 but illustrating a different operational condition.

To prevent waste material separated from a bottle from dropping in an uncontrolled manner, it is possible to provide at least one of the members 25a, 25b and/or one of the jaws 70a, 70b with a bore or bores which terminate in a respective frontal face and to connect said bore or bores with a source of vacuum. Such arrangement is shown in FIG. 12 and has the purpose to suck the waste material to the frontal face and to hold it there. In FIG. 12, the member 25b is shown to be provided with two passages 73 which terminate in the frontal faces 29 of the tines 25c and communicate with a bore 74 which is connected to a source of vacuum. With the bore 74 and the passages 73 under vacuum, separated waste material is held onto the frontal faces 29 of the part 25b. Only when the vacuum is released is the waste material held by the member 25b free to drop.

Figures 28, 29, 30:
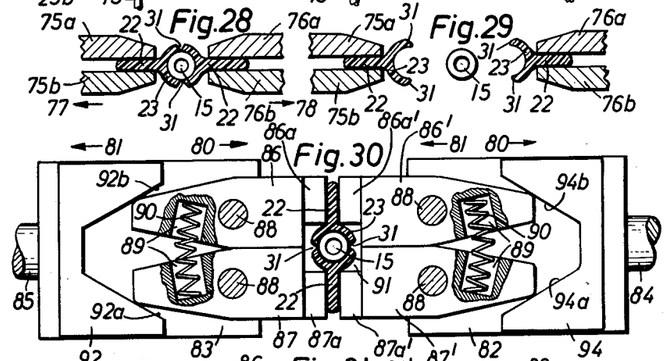
FIGS. 28 and 29 illustrate a sixth modification.
FIGS. 30 and 31 illustrate a seventh modification.

FIGS. 28 and 29 show a modification according to which fins 22 are engaged and gripped by jaws 75a, 75b and 76a, 76b. Such jaws form, for instance, the terminal parts of tonglike devices. As distinguished from the cases described so far, the fins 22 and annular extension 23 are not removed due to movements in directions perpendicularly to the extent of the fins 22 but in the directions of that extent of the arrows 77 and 78. The jaws 75a, 75b and 76a, 76b, after they have engaged the fins 22, as shown in FIG. 28, are pulled away from the bottle and blow pipe in the directions of the arrows 77 and 78 until they reach the position shown in FIG. 29. From FIG. 28 it will be clear that the annular ring 23 has been molded to have two notches 31, 31 and FIG. 29 shows that the pulling apart action of the two pairs of jaws, as provided in the construction of FIGS. 28 and 29, due to the provision of two notches, splits the annular extension into two semi-annular parts. In connection with the description of FIG. 10, it has been explained that one of the mold sections has a projecting wedge 33 which forms the notch 31 in the annular extension 23. In the construction of FIGS. 28 and 29, each of the two opposing mold halves has a wedge formation to form a notch 31. The device of FIGS. 28 and 29 may be used in combination with anyone of the constructions hereinbefore dealt with. For instance, it may take the place of the device 25 of the construction of FIGS. 1 to 16 and be used together with the grasping or gripping device 13. It may replace the device 25' of the construction of FIGS. 17 and 18, the device 25'' of FIGS. 19 and 20, and the device 25₂, 25₃ of FIGS. 21 to 24, respectively.

Figure 31:
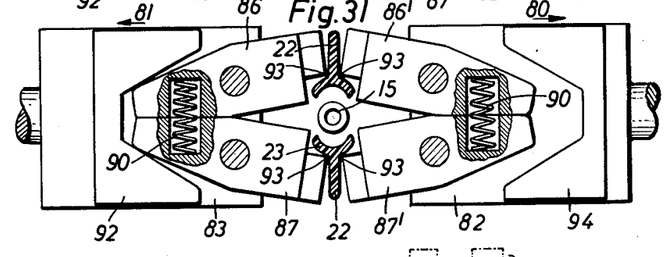

In the construction of FIGS. 30 and 31, there are two slides 82, 82 which are movable in the directions of the arrows 80, 81. These slides may be connected to hydraulic or pneumatic cylinders over piston rods 84, 85. Each slide carries tonglike parts 86, 87 and 86', 87', respectively, which are mounted to swing about pins 88 and which, at the ends remote from the blow pipe 15, are provided with depressions 89. Each pair of these depressions receives a compression spring 90. The springs 90 urge the jaws 86, 87, 86', 87' into the position shown in FIG. 30 and tend to hold them in that position. At the ends adjacent the blow pipe 15, the jaws 86, 87, 86', 87' are provided with extensions 86a, 87a, 86a' 87a' shaped to allow the blow pipe 15 and the fins 22 to be received in a central space 91. A part 92 on the slide 83, and a part 94 on the slide 82, are arranged to slide in the directions of the arrows 80 and 81. The part 92 is shown to be provided with camming surfaces 92a, 92b, and part 94 has camming surfaces 94a, 94b.

The construction of FIGS. 30 and 31 is used as follows: When the mold has been opened and the blown bottle carried by the blow pipe is ready to be freed of waste material clinging thereto, the slides 82 and 83 are moved toward each other until they reach the position shown in FIG. 30 in which position the fins 22 are clamped between the extensions 86a, 87a, 86a', 87a'. Next, the parts 92 and 94 are slid in the direction of arrows 80 and 81, respectively, until they assume the positions shown in FIG. 31. As the parts 92 and 94 make these movements, the camming surfaces 92a, 92b, 94a, 94b turn the jaws 86, 87, 86', 87' and swing their outer ends into engagement, while the inner ends spread. These turning movements of the jaws 86, 87, 86', 87', take place against the force of the compression springs 90. During these movements the fins 22 and the annular extension 23 are separated from the neck and shoulder of the bottle produced. From the drawing it is seen that the distance between the corners 93 of the opposite extensions 86a, 87a, 86a', 87a' decreases as the position of FIG. 30 changes to the position of FIG. 31, at least at the beginning of the change, which decrease increases the clamping pressure exerted upon the fins 22. To ease the removal of the annular extension 23 the latter is formed with two notches 31, as has been explained in the description of FIGS. 28 and 29.

Upon separation of the waste material, the slides 82, 83 are moved in the direction of the arrows 80, 81 back into their starting positions, whereby, due to the return movement of the slides 92 and 94 in the direction of the arrows 81 and 80, respectively, the jaws 86, 87, 86', 87' are made to swing back into their starting positions by the springs 90.

It is also possible to control in a positive manner the movements of a single pair of jaws only rather than the movements of both pairs of jaws. For instance, I provide the slide 92 with its camming surfaces 92a and 92b but omit the slide 94 with camming surfaces 94a, 94b. When the extensions 86a, 87a of the jaws 86, 87 of the slide 83 are pressed against the fins 22 and the annular extension 23 and thus also against the extensions 86a', 87a' of the jaws 86', 87', the fins 22 and the annular extension, as well as the jaws 86', 87' of the slide 82, are compelled to take part on the movements of the jaws 86, 87 of the slide 83, as this is shown in FIG. 31.

In the constructions of FIGS. 1 to 27, the waste-separating device of FIGS. 30 and 31 may, just as the device of FIGS. 28 and 29, take the place of the device 25.

Figure 32:
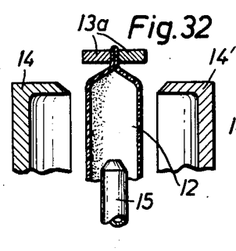
FIGS. 32 to 34 are explanatory of a certain mode of removal of waste from the bottom of a bottle.
Figures 33, 34:
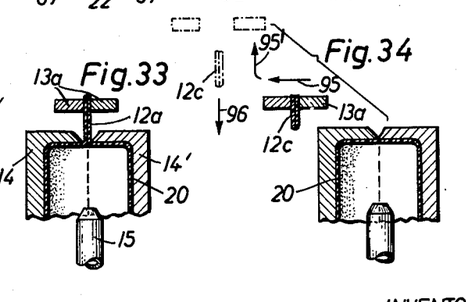

It has already been shown, with respect to FIGS. 1 to 6, 22 to 24, 25 to 27, how waste material on the bottom of a freshly blown bottle may be removed. FIGS. 32 to 34 deal with a construction designed to remove such waste in another manner. The removal according to FIGS. 32 to 34 contitutes a modification of the removal according to FIGS. 1 to 6 and 22 to 24. FIG. 32 represents a condition in the sequence of events which occurs a little later than the condition illustrated in FIG. 1. The grasping device 13a has lowered the severed tube length 12 into the space between the open mold sections 14, 14'. The leading end of the tube length 12 is shown to pass over the blow pipe 15 which enters into the open mold space from opposite, and in alignment with, the extrusion direction. Upon the closing of the mold over the tube 12, there remains waste material which extends between the grasping device and the top of the mold. The top of the mold is shown to form the bottom of the bottle. The waste material 12a will be torn off as the grasping device moves in the direction of the arrow 95. Thus, as distinguished from the vertical upward movement of the grasping device of FIGS. 1 to 6 and 22 to 24, the grasping device 13a is laterally moved, as in the case of FIGS. 25 to 27, but after the lateral movement, it is moved upwardly in the direction of the arrow 95', provided the grasping or gripping device is to be used as severing device as well. The gripping device is opened either during the horizontal or vertical movement so that the waste material torn off and taken along by the device may be dropped in the direction of the arrow 96 into a collecting container. The construction and use of the construction of FIGS. 32 to 34 proves useful when the severed tube length to be introduced in a mold is transported from an extrusion nozzle horizontally rather than vertically. A vertical leg of the movement of the gripping device may be altogether dispensed with if the severed tube length is moved across the parting plane of the mold used. In such a case, the gripping device may be arranged somewhat above the mold, at a level that will ensure the tearing off of the waste material from the bottom of the bottle. The gripping device performs a horizontal reciprocatory movement. The tearing off is done as shown, for instance, in FIGS. 30 and 31.

So far, it has been assumed that blow pipe and the bottle supported by the blow pipe are stationary and that the waste-separating device 25, 25', 25''; 25₂, 25₃; 70a 70b; 75a, 75b, 76a, 76b; 86, 87, 86', 87', respectively, after the fins 22 and the annular extension 23 have been grasped, are moved relative to blow pipe and bottle. However, it will be appreciated that it is within the scope of the invention, as has already been indicated, to provide a waste-separating device which upon the closing movement of the cooperating parts will stand still while the bottle is moved relative to the waste-separating device.

It is believed that the method of my invention as well as the construction and operation of the forms of apparatus for practicing the invention, as shown, and the many advantages thereof will be understood from the foregoing detailed description. Some of the features and advantages are reviewed hereinafter.

Essentially, the invention provides mechanicaly stripping freshly blown plastic articles from waste material adhering thereto. The article, as soon as sufficiently solidified, and a waste-stripping device are relatively moved past each other. This stripping or waste-removing device acts upon waste that projects beyond the profile of the article. If there is waste that projects in more than one place, the waste-removing device or devices have to be formed accordingly to act upon all the waste that projects beyond the profile of the article. Thus, waste may be removed mechanically in one place only or in more than one place or in all places of occurrence. If there are more than a single waste-removing device, they may be operated in dependence from each other or independently. The relative movement of article and waste-removing device is ordinarily either perpendicular to or across the parting surface of the mold used. In case of perpendicular movement it is necessary first to move the article away from the open mold space, after opening the mold, so that the following abutting and relative movements of article and waste-removing device will not interfere with the open mold sections. This can be done by moving either the article or the mold. If the relative movement is across the parting surface of the mold, no movement prior to the abutting and relative movements may be needed. FIGS. 17 and 18 show a turning of the article about its axis through 90° prior to the abutting and relative movements, and FIGS. 19 and 20 show a rotatory movement of the article prior to the abutting and relative movements.

The blown article is preferably supported by a blow pipe, while being moved or standing still. The blow pipe is advantageously used to carry the blown article near the waste-removing device. As has been stated, if the abutting and relative movements of article and waste-removing device are perpendicular to the parting plane of the mold, the blow pipe, while supporting the blown article, is moved out of reach of the mold, or the mold is moved away, so that the following abutting and relative movements may take place. If the abutting and relative movements are across the parting plane of the mold, the blow pipe may, for instance, turn about its axis through 90° or swing about an end thereof.

The waste-removing device of the invention consists essentially of two cooperating parts. These parts are moved against the plastic waste on opposite sides thereof and preferably clamp the waste between them and thus separate the waste from the article, when being relatively moved with respect to the article. The two parts may be formed differently, for instance, tong-like.

With waste that circularly adheres to the article, the invention provides notching such waste in one or two places, during the formation of the article, which allows the waste to split and to be easily removed. A single notch is preferably provided at a place remote from the position assumed by the transferred waste material.

It will be apparent that the present invention is not restricted to the use of tubular shapes to start with. Instead, the invention is applicable to preforms of any other shape, for instance, sheets, etc. Nor is the invention restricted to the extrusion of tubing directly into the space of an open mold. Tubes and other preforms may be worked according to this invention even though they are moved into an open mold space by means of a gripping device or by other means from places other than above the mold.

It will further be apparent that while I have shown and described my invention in a few forms only, many changes and modifications may be made without departing from the spirit of the invention defined in the appended claims.

I claim:

1. A process for the manufacture of hollow articles from plastics by blowing, using a sectional mold, blow pipe means, and means for tearing off flashing, comprising introducing at least a single preform of the plastic material used, in condition of plasticity, into the open space between the sections of said mold, closing said mold about at least a single segment of said preform, the closed mold having at least a single composite cavity conforming in shape to the article to be produced, admitting a fluid pressure medium to the mold-enclosed segment through said blow pipe means, thus expanding said segment into molding contact with the wall defining said mold cavity, and forming a blown article having flashing adhering thereto and being supported by said blow pipe means, opening said mold, withdrawing from said mold said blow pipe means with said blown article thereon, positioning stid blown article and said flashing-tearing means to be relatively movable along a straight path, grasping the flashing in the flashing-tearing means on opposite sides of the blow molded article, and effecting a relative straight movement of said blown article and said flashing-tearing means, thereby causing said flashing-tearing means to tear said flashing from said blown article.

2. A process for the manufacture of hollow articles from plastics by blowing, using a sectional mold and gripping means, comprising extruding at least a single preform of the plastic material used, severing a length of said preform from the parent body of plastic material with the aid of said gripping means, moving said gripping means with the severed length supported thereby to introduce said length, while still in condition of plasticity, into the open space of said mold, leaving said gripping means outside the mold sections to be closed, closing said mold about a segment of said severed length, thereby pinching said segment adjacent said gripping means, admitting a fluid pressure medium to the mold-enclosed segment, forming a blown article having flashing adhering thereto, causing said gripping means to hold a portion of flashing formed between said mold and gripping means, moving said gripping means and said portion of flashing away from said mold, thereby tearing said portion of flashing from said blown article while holding said blown article within said mold.

3. An apparatus for the manufacture of hollow articles from plastics by blowing, comprising a mold including opposing sections to be closed and opened, blow pipe means to admit a fluid pressure medium to an inflatable embryo product within the closed mold and thus to expand said embryo product to the article to be produced, the expanded or blown article having two formations of flashing adhering thereto, said formations projecting from said article in opposite directions, flashing-tearing means, means to close and open said mold, means to withdraw from the open mold said blow pipe means and said blown article thereon, means for positioning the withdrawn article and said flashing-tearing means to be relatively movable along a straight path, and means for effecting said relative movement, said flashing-tearing means including opposing parts provided with faces, said means for position-and effecting said relative movement being adapted to place said faces in grasping condition with respect to opposite sides of said formations and to tear said formations from the blown article.

4. In the apparatus according to claim 3, a single pair of opposing members of forklike shape, said pair constituting said flashing-tearing means, each member being provided with two tines, the end faces of the tines being adapted to abut against said opposite sides and thus forming said grasping faces.

5. In the apparatus according to claim 4, the tines of one member of said pair being longer than the tines of the other member, said means for performing said relative tearing movement moving said members, while said two formations of flashing are sandwiched between the end faces of the four tines, in the direction toward the member having the shorter tines.

6. In the apparatus according to claim 3, said blow pipe means including four blow pipes mounted in form of a cross and to be rotatable about the point of intersection, said mold sections, said cross of blow pipes, and said flashing-tearing means being mounted so as to make one of the blow pipes cooperate with said mold to be ready to carry the article last blown into another blow pipe position while another blow pipe supporting the previously blown article and said flashing-tearing means perform said relative tearing movement.

7. In the apparatus according to claim 3, two units of flashing-tearing means, said blow pipe means including two spacedly and slidably arranged blow pipes, said mold sections, blow pipes, and two units being mounted so as to make one of the blow pipes cooperate with the mold to be ready to carry the article last blown into another blow pipe position while the other blow pipe supporting the previously blown article and one of said two units perform said relative tearing movement.

8. In the apparatus according to claim 3, means to extrude a preform toward the space within the open mold, gripping members adapted to sever a length of preform from the parent body and to transport the severed length into said open mold space, means to close and open said gripping members and to relatively move said mold and gripping members toward and from each other.

9. In the apparatus according to claim 3, said flashing tearing means including two pairs of clamping members provided with faces to engage opposite sides of said formations, said means for performing said relative tearing movement acting in the directions of the extent of the two waste formations.

10. A process for the manufacture of hollow articles from plastics by blowing, using a sectional mold, blow pipe means, and flashing-tearing means, comprising introducing at least a single preform of the plastic material used, in condition of plasticity, into the open space between the sections of said mold, closing the mold about at least a single segment of said preform, the closed mold having at least a single composite cavity conforming in shape to the article to be produced, admitting a fluid pressure medium to the mold-enclosed segment through said blow pipe means, thus expanding said segment into molding contact with the wall defining said mold cavity, and forming a blown article having flashing adhearing thereto and being supported by said blow pipe means, opening the mold, turning said blown article through 90°, and positioning said blown article and said flashing-tearing means to be relatively movable across the parting plane of said mold, and to permit said flashing-tearing means, upon effectuation of a relative movement of said blown article and flashing-tearing means across said parting plane, to grasp said flashing, grasping said flashing in said flashing-tearing means, and effecting said relative movement, thereby tearing said flashing from said article.

11. An apparatus for the manufacture of hollow articles from plastics by blowing, comprising a mold including opposing sections to be closed and opened, blow pipe means to admit a fluid pressure medium to an inflatable embryo product within the closed mold and thus to expand the embryo product to the article to be produced, the expanded article having two formations of waste projecting therefrom in opposite directions, flashing-tearing means, means to close and open said mold, means to withdraw said blow pipe means and said expanded article thereon from the open mold, means for positioning the withdrawn article and said flashing-tearing means to be relatively movable along a straight path, and for permitting said flashing-tearing means, upon effectuation of a relative movement of said expanded article and said flashing-tearing means along a straight path, to grasp opposite sides of said two formations, and means for effecting said relative movement, said flashing-tearing means including two pairs of clamping members provided with faces to be placed in abutting condition with respect to said opposite sides, said means for performing said relative tearing movement acting in the directions of the extent of said formations, each of said pairs being constituted by two normally aligned levers, each lever being arranged to swing about a point intermediate the ends thereof, adjacent end faces of said levers constituting said faces and being adapted to tear, when swinging, said formations of flashing from the expanded article.

References Cited in the file of this patent
UNITED STATES PATENTS

| | | |
|---|---|---|
| 2,890,483 | Soubier | Jun. 16, 1959 |
| 2,943,349 | Adams et al. | July 5, 1960 |
| 2,953,814 | Mumford | Sept. 14, 1960 |
| 2,975,473 | Hagen et al. | Mar. 21, 1961 |
| 2,978,745 | Langecker | Apr. 11, 1961 |
| 2,988,776 | Schaich | June 20, 1961 |
| 2,994,103 | Schaich | Aug. 1, 1961 |
| 3,003,187 | Schaich | Oct. 10, 1961 |
| 3,009,198 | Kalman et al. | Nov. 21, 1961 |